No. 659,137. Patented Oct. 2, 1900.
L. N. DOUBLER.
APPARATUS FOR COOKING AND STEAMING MEATS, VEGETABLES, &c.
(Application filed Oct. 30, 1899.)
(No Model.)
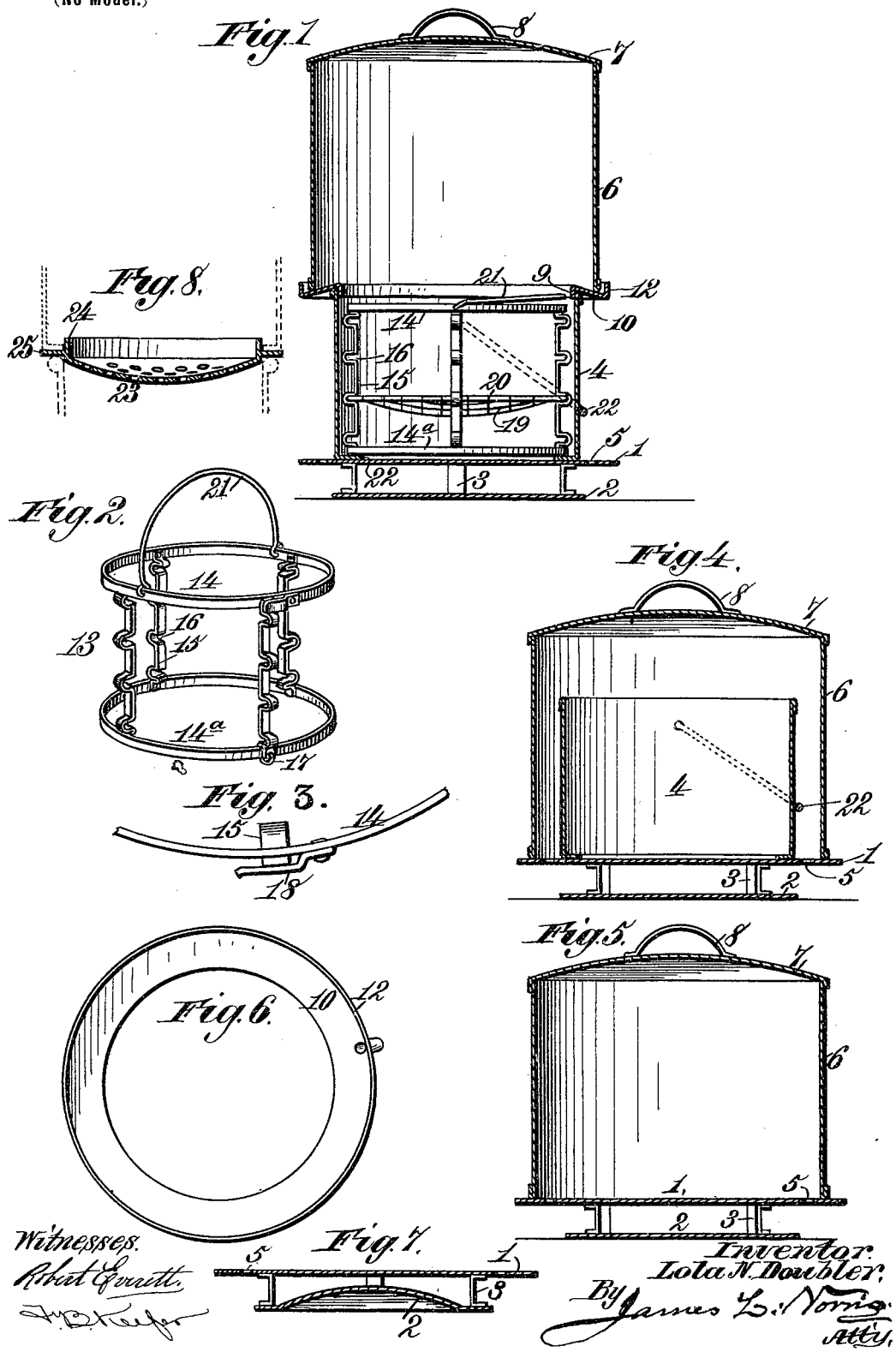

UNITED STATES PATENT OFFICE.

LOLA N. DOUBLER, OF MILTON, PENNSYLVANIA.

APPARATUS FOR COOKING AND STEAMING MEATS, VEGETABLES, &c.

SPECIFICATION forming part of Letters Patent No. 659,137, dated October 2, 1900.

Application filed October 30, 1899. Serial No. 735,255. (No model.)

*To all whom it may concern:*

Be it known that I, LOLA N. DOUBLER, a citizen of the United States, residing at Milton, in the county of Northumberland and State of Pennsylvania, have invented new and useful Improvements in Apparatus for Cooking and Steaming Meats, Vegetables, and other Substances, of which the following is a specification.

My invention relates to apparatus for cooking and steaming meats, vegetables, and other substances, my object being to provide an apparatus by which food of all kinds may be baked, steamed, or stewed in any quantities required.

It is my purpose to provide a cooking apparatus which shall have a simple and economical construction and shall be capable of use with any ordinary stove or heater or with a kettle or pan of any kind for cooking by dry heat or by steam either separately or simultaneously. I aim also to simplify and improve the construction and operation of apparatus of this type, to render it readily and quickly convertible, and to improve the devices for supporting substances to be cooked by rendering them easily and quickly removable and adjustable and securely held in the position given them.

It is an object of my invention also to make provision for increasing the operative capacity of the steaming apparatus without adding to the inclosing portions, so that double the quantity of edibles may be steamed when desired.

My invention also includes novel and useful features, all of which will be fully explained in the following specification and then particularly pointed out and defined in the claims.

For the purposes of the following description reference is had to the accompanying drawings, in which—

Figure 1 is a sectional view showing the complete apparatus arranged for use. Fig. 2 is a perspective view of the rack-support removed from the apparatus. Fig. 3 is a plan view of the same, showing the means for fastening the movable bar by which the supporting racks or shelves are inserted and removed. Fig. 4 is a sectional view showing an arrangement of the parts for use as an oven and for cooking by dry heat. Fig. 5 is a similar section showing an arrangement for increasing the capacity of the apparatus. Fig. 6 is a detail view of the annular connection between the upper and lower containers. Fig. 7 is a detail view showing a modified construction of the base-piece. Fig. 8 is a view showing a false bottom for the lower container.

The reference-numerals 1 and 2 in said drawings indicate the members forming the base-piece of the cooking apparatus, consisting of two parallel metallic plates circular in form and arranged one above the other with a suitable interval between them, a rigid connection being afforded by means of angular metal strips 3. The lower member 2 is of less diameter than the upper member 1, the diameter of the latter being sufficiently greater than that of the lower container 4 to permit the formation of a series of perforations 5 in its projecting margin between its edge and the base of the container. Said container is of sheet metal, open at both ends, and is preferably of circular shape, although I may give it any other form, if desired, such as square, oval, or polygonal. The upper container 6 is of somewhat greater diameter than the lower and corresponds in form to the latter. It is closed at its upper end by a cover or top 7, soldered or otherwise secured, so as to form a joint impervious to steam, and is provided with a handle 8. It seats upon an annular connection having a narrow flange 9, which enters the top of the lower container, and an outwardly and downwardly projecting rim 10, which supports the edge of the lower open end of the container 6. The downward inclination of said rim prevents the water of condensation from flowing back into the interior, and to carry off this water the rim 10 is provided with a narrow flange 12 upon its outer edge, thereby forming a shallow trough by which the condensed moisture may be conducted to an exit of any suitable construction.

The reference-numeral 13 denotes the basket or rack support. It consists of an upper and lower metal ring 14 and 14ª, to which are rigidly secured at equal intervals strips 15, provided with outwardly-extending notches 16, formed by bending the strips horizontally outward and then back, leaving a space between the two parallel portions to insert the edge of a dish or shelf. One of the four strips is connected to one of the rings by a pivot 17, its other end being capable of entering between a keeper upon the exterior of the opposite ring, by which it is fastened. Said keeper consists of a strip of metal 18, secured rigidly to the ring by one of its ends, the remainder of said strip being parallel with the outer face of the ring, but with sufficient intervening space to permit the end of the strip to enter. It can, however, at any time be slipped out of engagement with the keeper and turned upon its pivoted bearing to enable trays to be inserted or removed. These trays I form, preferably, of steel wire, which is coated or covered with tin to prevent oxidation. Pieces 19 of this wire of suitable length are intermeshed to form a netted fabric, and the ends are connected to a strong marginal wire 20, of such size that it can be easily inserted in and withdrawn from the notches 16 in the strips 15. The marginal wire 20 will be of such strength as to give the necessary stiffness to the trays. The latter may advantageously have a concave or dish shape to adapt them to hold potatoes or other vegetables, eggs, or any substance not requiring a pan or impervious dish. The size of the lower container is such as to enable it to receive the basket with whatever contents it may have. Said basket is provided with a bail 21 to assist in handling it, and a similar bail 22 is also placed upon the lower container.

The lower member 2 of the base-piece may be convex upon its upper face, if preferred, as shown in Fig. 7. This base can be used over a burner, such as is seen upon oil-stoves or gas-ranges, or it may form the bottom of an oven. The basket charged with such a number of trays as may be needed is placed upon the upper member 1 and surrounded by the lower or open container 4. The upper container 6 with closed top is then placed over the whole, forming an oven which is suitable for all methods of cooking by dry heat. The perforations 5 in this arrangement are between the lower edges of the two containers 4 and 6, so that the hot air circulates around the inner. The oven may be formed, however, by using the container 6 only.

The method of using the apparatus as a steamer is too obvious to require explanation. The cooking capacity may be doubled by placing the container 6 upon the annular connection 10, which is placed on the upper edge of the container 4. A basket constructed as already described, but of such height as to occupy the whole inner space, is placed inside, double the number of trays being available in this arrangement.

Instead of using trays alone I may place a dish of suitable form in the basket beneath a tray, said dish catching the drippings and containing water for basting. There are many methods of using the apparatus, either as a whole or a number of its parts less than the whole, which will readily suggest themselves to persons familiar with the art of cooking and which need no specific description.

The lower container may be formed with an inwardly-turned flange 22 to support the basket, and I may also provide a false bottom 23 for the same, said bottom being concave and perforated and having a vertical flange 24 to lie inside the inwardly-turned flange 22 on the container. This false bottom can be placed on a kettle and the container placed thereon to form a steamer, or it can be placed over a basket and a second basket be placed thereon, the upper container surrounding the latter and resting on a circumferential flange 25.

What I claim, and desire to secure by Letters Patent of the United States, is—

1. In a cooking apparatus, the combination with a base formed of two parallel plates rigidly connected with a suitable intervening space, the upper plate being of greater diameter and having a series of perforations near its edge, of two containers, one open at both ends and the other, which is of greater diameter than the first, closed at one end, and an annular connection between the same consisting of an outwardly and downwardly extending rim having a narrow flange to enter the open top of the smaller container, substantially as described.

2. In a cooking apparatus, a basket to support the food-containing trays, consisting of an upper and a lower ring and strips extending from one ring to the other and provided with notches formed by bending the strips horizontally outward and then back, one of said strips having one end pivotally connected to one of the rings and the other end free but adapted to enter a keeper on the other ring for securing it in upright position, substantially as described.

3. In a cooking apparatus, the combination with two parallel rings of metal one above the other, of strips extending from one ring to the other and having notches formed by bending the strips outward and then back, one of said strips having its end pivoted to one of the rings and the other ring being provided with a keeper consisting of a metallic strip having one end rigidly secured to the ring and the remaining portion and end in parallelism with but removed from the outer face of said ring to allow the end of the pivoted strip to enter, substantially as described.

4. In a cooking apparatus, the combination with a base formed of two parallel metal plates rigidly connected with a suitable intervening space, of a container open at both ends, one end adapted to lie within a series of perforations in the upper plate, a second container closed at one end, its open end adapted to lie outside said perforations and a basket to sit within the latter and formed of an upper and lower ring connected by notched strips, one of which is pivoted to one ring and has a detachable connection to the other, substantially as described.

In testimony whereof I have hereunto set my hand in presence of two subscribing witnesses.

LOLA N. DOUBLER.

Witnesses:
THOS. C. KERSTELER,
EDWIN H. BRUSH.